US010339625B2

(12) United States Patent
Pangam et al.

(10) Patent No.: US 10,339,625 B2
(45) Date of Patent: Jul. 2, 2019

(54) COMMAND SCHEDULER FOR A DISPLAY DEVICE

(71) Applicant: INTEL CORPORATION, Santa Clara, CA (US)

(72) Inventors: Aashish Pangam, Mumbai (IN); Srikanth Rangarajan, Bangalore (IN); Balakesan P. Thevar, North Plains, OR (US)

(73) Assignee: INTEL CORPORATION, Santa Clara, CA (US)

(*) Notice: Subject to any disclaimer, the term of this patent is extended or adjusted under 35 U.S.C. 154(b) by 69 days.

(21) Appl. No.: 15/607,357

(22) Filed: May 26, 2017

(65) Prior Publication Data

US 2017/0262958 A1 Sep. 14, 2017

Related U.S. Application Data

(62) Division of application No. 14/092,011, filed on Nov. 27, 2013, now abandoned.

(51) Int. Cl.
*G06T 1/20* (2006.01)
*G06F 3/14* (2006.01)
(Continued)

(52) U.S. Cl.
CPC .............. *G06T 1/20* (2013.01); *G06F 3/1407* (2013.01); *G06F 9/3836* (2013.01); *G06F 9/445* (2013.01);
(Continued)

(58) Field of Classification Search
CPC . G06T 1/20; G06T 1/60; G06F 9/3836; G06F 9/445; G06F 3/1407; G06F 2211/1097; G09G 5/006; G09G 2370/08
(Continued)

(56) References Cited

U.S. PATENT DOCUMENTS

| 5,426,445 A | 6/1995 | Prouty et al. |
| 6,366,589 B1 * | 4/2002 | Naudus, Jr. ............. H04L 5/023 370/282 |

(Continued)

FOREIGN PATENT DOCUMENTS

| CN | 1828541 A | 9/2006 |
| EP | 1320067 A1 | 11/2002 |

OTHER PUBLICATIONS

Search Report dated May 22, 2015 for European Application No. 14192162.7, 6 pages.
(Continued)

*Primary Examiner* — Ke Xiao
*Assistant Examiner* — Kim Thanh T Tran
(74) *Attorney, Agent, or Firm* — Schwabe, Williamson & Wyatt, P.C.

(57) ABSTRACT

Systems and methods consistent with the present disclosure may be utilized to negate the distinction between a display device operating in video and command modes in that commands associated with either mode are prioritized and executed according to a command scheduler consistent with the present disclosure. A command scheduler consistent with the present disclosure includes a display driver stack and a scheduler coupled to the display driver stack. The scheduler is configured to receive commands from the driver stack. Further, the scheduler is configured to queue and schedule the commands to be executed during a boot environment and during runtime. A host controller may also be coupled to the scheduler and may receive at least one of the commands from the scheduler. In time, the host controller transfers the commands to a device for execution.

13 Claims, 10 Drawing Sheets

(51) Int. Cl.
  *G06T 1/60* (2006.01)
  *G09G 5/00* (2006.01)
  *G06F 9/445* (2018.01)
  *G06F 9/38* (2018.01)

(52) U.S. Cl.
  CPC ............... *G06T 1/60* (2013.01); *G09G 5/006* (2013.01); *G06F 2211/1097* (2013.01); *G09G 2370/08* (2013.01)

(58) Field of Classification Search
  USPC .......................................................... 345/520
  See application file for complete search history.

(56) References Cited

U.S. PATENT DOCUMENTS

| | | | | |
|---|---|---|---|---|
| 2001/0012270 | A1* | 8/2001 | Godoroja | G06F 21/606 370/230 |
| 2003/0107576 | A1 | 6/2003 | Andres et al. | |
| 2003/0125907 | A1* | 7/2003 | Saint-Hilaire | G06F 11/3447 702/186 |
| 2004/0015740 | A1 | 1/2004 | Dautelle | |
| 2004/0260882 | A1 | 12/2004 | Martinez et al. | |
| 2006/0184614 | A1* | 8/2006 | Baratto | G06F 3/14 709/203 |
| 2007/0040788 | A1* | 2/2007 | Saha | G06F 3/14 345/98 |
| 2007/0273699 | A1* | 11/2007 | Sasaki | G06F 9/3879 345/502 |
| 2008/0075175 | A1 | 3/2008 | Takahashi et al. | |
| 2008/0170087 | A1* | 7/2008 | Kim | G09G 3/3611 345/690 |
| 2008/0310439 | A1 | 12/2008 | Gale et al. | |
| 2009/0089785 | A1 | 4/2009 | Marwinski et al. | |
| 2010/0202470 | A1 | 8/2010 | Luan | |
| 2010/0313019 | A1 | 12/2010 | Joubert | |
| 2011/0063331 | A1* | 3/2011 | Karrenbauer | G09G 3/3426 345/690 |
| 2012/0300123 | A1 | 11/2012 | Lares | |
| 2013/0044089 | A1 | 2/2013 | Chang-Chian et al. | |
| 2013/0057763 | A1 | 3/2013 | Cha et al. | |
| 2013/0262788 | A1 | 10/2013 | Zhang et al. | |
| 2014/0136828 | A1* | 5/2014 | Lewis | G06F 9/4416 713/2 |
| 2014/0317458 | A1* | 10/2014 | Paul | H03K 19/00 714/56 |
| 2014/0347340 | A1* | 11/2014 | Tse | G09G 5/18 345/212 |
| 2015/0002520 | A1 | 1/2015 | Rao | |

OTHER PUBLICATIONS

Non-Final Office Action dated Jan. 15, 2016 for U.S. Appl. No. 14/092,011, 14 pages.
Final Office Action dated Jun. 2, 2016 for U.S. Appl. No. 14/092,011, 17 pages.
Non-Final Office Action dated Jun. 29, 2017 for U.S. Appl. No. 14/092,011, 15 pages.
Final Office Action dated Nov. 30, 2017 for U.S. Appl. No. 14/092,011, 19 pages.
Office Action dated Oct. 5, 2017 for European Application No. 14192162.7, 6 pages.

* cited by examiner

FIGURE 3

| | | | | | | | |
|---|---|---|---|---|---|---|---|
| Application | CSI 311 | CSI 316 | CSI 356 | CSI 361 | CSI 367 | CSI 371 | CSI 376 |

| | | | | | | | |
|---|---|---|---|---|---|---|---|
| Protocol Standard | CSI 310 | DSI 315 | DigRF 355 | UniPro 360 | LLI 365 | SSIC 370 | PCIe 375 |

| | | |
|---|---|---|
| Physical Standard | D-PHY 305 | M-PHY 350 |

COMMAND SCHEDULER FOR A DISPLAY DEVICE

RELATED APPLICATIONS

This application claims the benefit of priority from U.S. Non-Prov. patent application Ser. No. 14/092,011 filed 27 Nov. 2013 which is entirely incorporated by reference herein.

FIELD

This disclosure pertains to computing systems, and in particular (but not exclusively), to techniques for scheduling commands within a display system.

BRIEF DESCRIPTION OF THE DRAWINGS

FIG. 3 is a diagram illustrating an embodiment of a low power data transmission platform.

DETAILED DESCRIPTION

Figure 1:
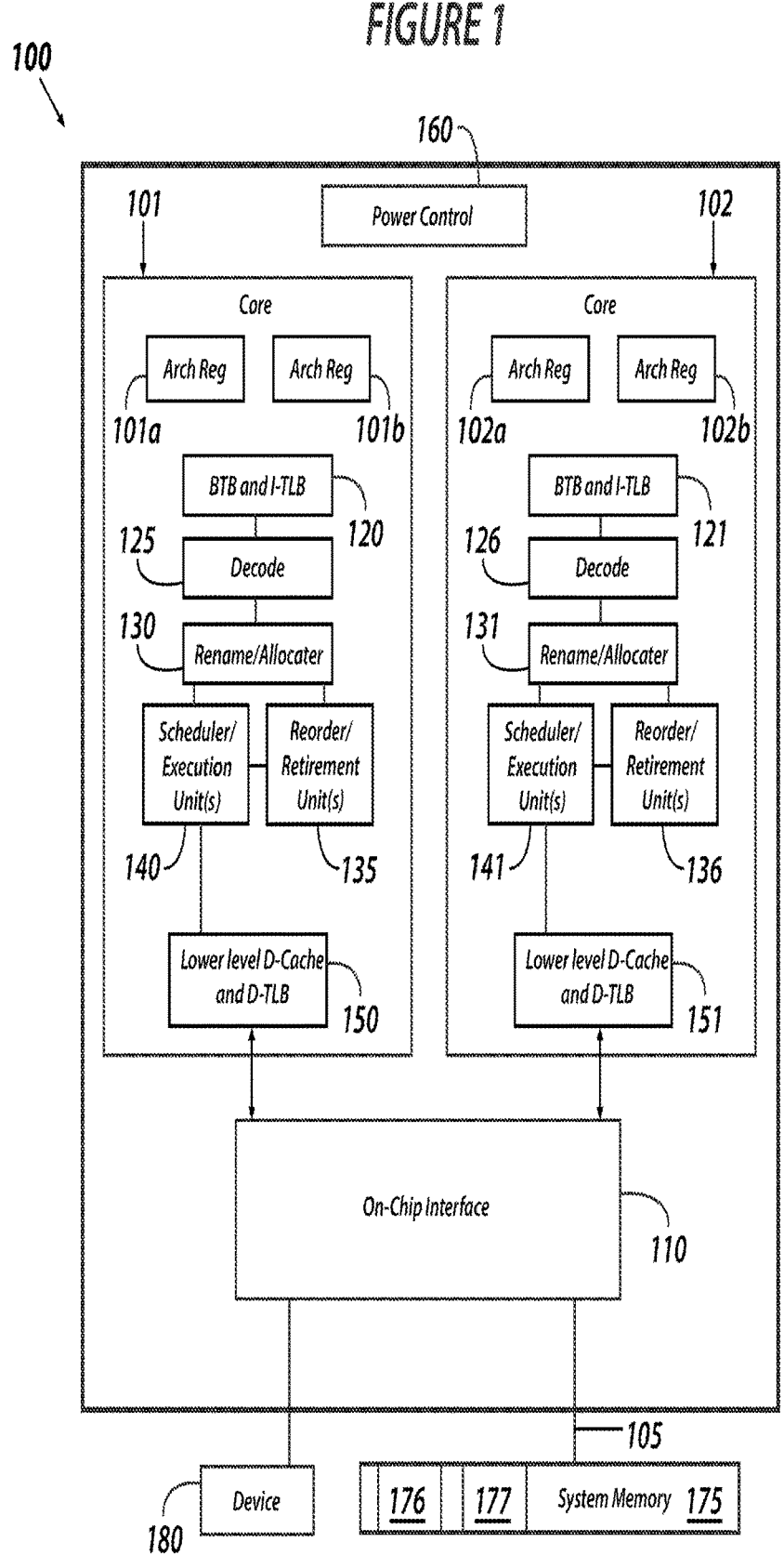
FIG. 1 is a diagram illustrating an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etcetera in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Note that the apparatus, methods, and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or includes an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example, in one embodiment, a memory controller hub is disposed on the same package and/or die as processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etcetera in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
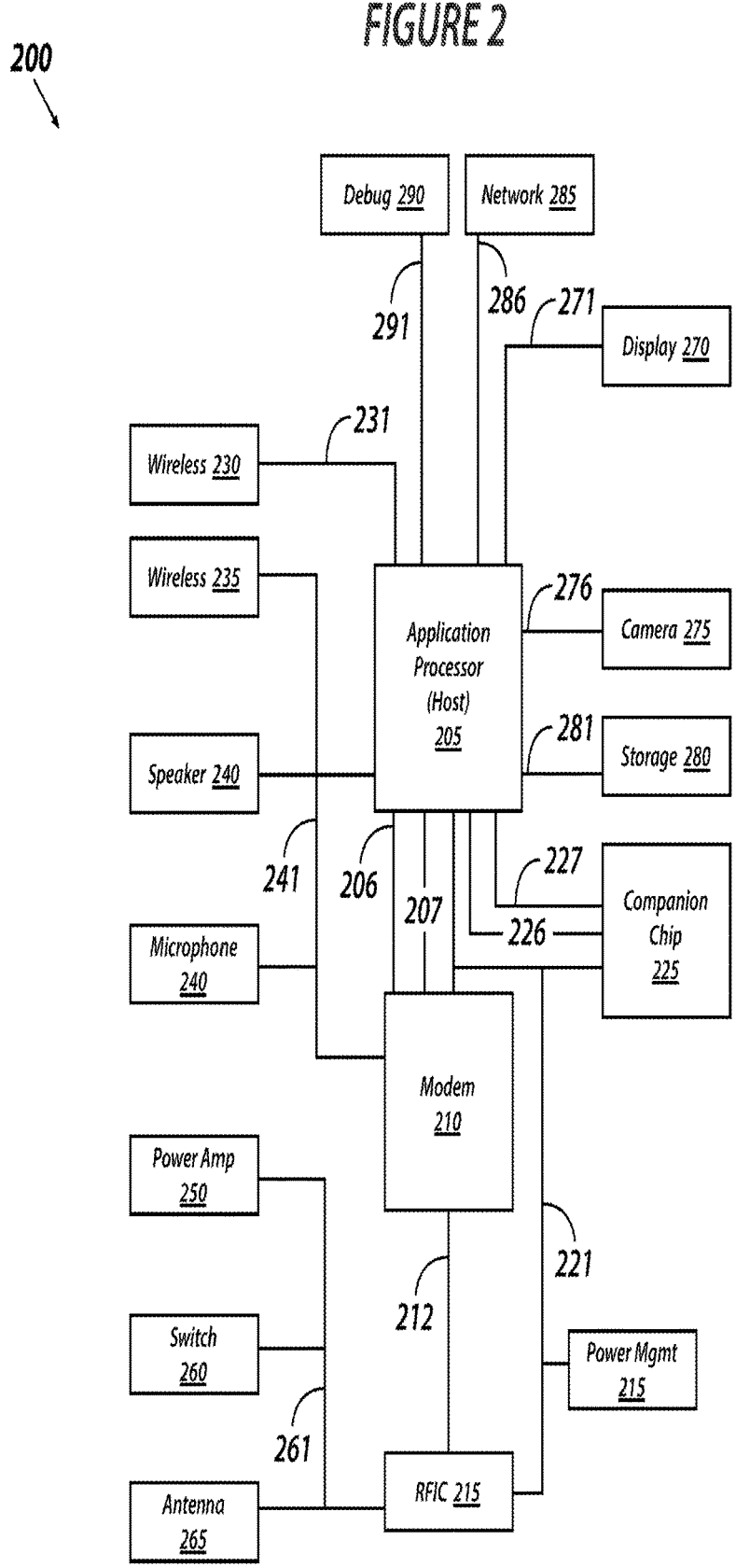
FIG. 2 is a diagram illustrating an embodiment of a low power computing platform.

Referring to FIG. 2, an embodiment of a low power computing platform is depicted. In one embodiment, low power computing platform 200 includes a user endpoint, such as a phone, smartphone, tablet, ultraportable notebook, a notebook, a desktop, a server, a transmitting device, a receiving device, or any other known or available computing platform. The illustrated platform depicts a number of different interconnects to couple multiple different devices. Exemplary discussion of these interconnect are provided below to provide options on implementation and inclusion. However, a low power platform 200 is not required to include or implement the depicted interconnects or devices. Furthermore, other devices and interconnect structures that are not specifically shown may be included.

Starting at the center of the diagram, platform 200 includes application processor 205. Often this includes a low power processor, which may be a version of a processor configuration described herein or known in the industry. As one example, processor 200 is implemented as a system on a chip (SoC). As a specific illustrative example, processor 200 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor.

FIG. 3 is a diagram illustrating an embodiment of a low power data transmission platform. As shown, an application layer, protocol standard layer, and physical standard layer are displayed in the figure. In particular, the application layer provides various instances of a camera serial interface (CSI)—311, 316, 356, 361, 367, 371, and 376. Notably, CSI may include a unidirectional differential serial interface to transmit data and clock signals.

The protocol standard layer includes another instance of a CSI interface 310 and a Digital Serial Interface (DSI) 315. DSI may define a protocol between a host processor and a peripheral device using a D-PHY physical interface. In addition, the protocol standard layer includes a DigRF interface 355, UniPro interface 360, Low Latency Interface (LLI) 365, SuperSpeed Inter-Chip (SSIC) interface 370, and Peripheral Component Interconnect Express (PCIe) 375 interface.

Lastly, the physical standard layer provides a D-PHY 305 sub-layer. It may be understood by one having ordinary skill in the art that D-PHY includes a physical layer solution upon which MIPI camera interfaces, display serial interfaces, and general purpose high-speed/low-power interfaces are based. In addition, the physical standard layer includes a M-PHY sub-layer 350 which is the successor of D-PHY, requiring less pins and providing more bandwidth per pin (pair) with improved power efficiency.

Many conventional computing devices require a boot up sequence before the devices are able to operate in normal runtime mode. One having ordinary skill in the art may appreciate that boot up (e.g., booting) refers to the initial set of operations that a computer system performs after the device is turned on (e.g., when electrical power to the CPU is switched on or when the computer is reset). On modern general purpose computers, booting up may take tens of seconds to perform any of a power-on self-test to locate and initialize peripheral devices, along with finding, loading and starting an operating system. The boot up process typically ends when the device is ready to perform its normal operations during runtime.

Typically, booting occurs during "video mode" whereas runtime occurs during "command mode." Boot up process occurs most often in a limited environment which may not support interrupts. In MIPI DSI applications, a display device may operate in video mode during pre-runtime in an Unified Extensible Firmware Interface (UEFI), EFI, or BIOS environment.

During video mode, display data is continuously sent by a display controller to a display device without software intervention. However, because a framework to handle interrupts is often not present in video mode, interrupts may not be handled in time or may not be handled at all.

In addition, many computing devices utilize non-real time operating systems (e.g., Windows and Linux operating systems) which are non-deterministic. As such, many of these systems cannot guarantee that display related commands are processed in real time. It should be understood by one having ordinary skill in the art that display related commands may not be considered time critical in view of other requests within the computer system which needs immediate attention. However, because users interface directly with display devices (e.g., monitors), it is desirable for computing systems to be more responsive to display commands in real time.

Moreover, as the frame rate set by software applications increases (e.g., from 22, 48, 60 fps and beyond), display devices need to be capable of processing larger quantities of display information to avoid frame drops and display glitches. Accordingly, it is desirable for a display system to satisfy both time and non-critical demands. The present disclosure addresses this need.

As described above, in MIPI DSI based communication systems, a display device typically operates in one of two modes—video or command modes. Video mode may be described as a mode of operation used in the pre-operating or pre-runtime environment which does not require any software intervention. Video mode may be post boot but this is not often the case as video mode typically requires an update to source buffer and does not implement some power saving features like Dynamic Self Refresh. In addition, video mode uses a vertical sync ("vsync") pulse to determine the live status of a display device/subsystem. A vsync pulse may also be used to indicate an end of a current scan of a display buffer. Alternatively, the command mode may be engaged during runtime.

In some implementations, a vsync pulse is generated after each frame is processed or according to a set number of frames processed per second. For example, for computing systems that feature frame rates of 60 Hz, the corresponding number of vsync pulses for this frame rate is 60 pulses per second. Accordingly, display devices with higher refresh rate requirements will typically have higher vsync pulses per interval (e.g., per second).

During the transition from video to command mode, the display device is powered down for a short period of time, during which, the display screen flickers or blanks outs. Accordingly, the transition from video to command mode is not typically a smooth transition. However, because user experience is becoming increasingly more important, flickers and blank outs may no longer be acceptable. The present disclosure provides a solution to address these shortcomings.

Alternatively, the command mode utilizes tearing effect signals or interrupts to prevent tearing from occurring. One having ordinary skill in the art may appreciate that tearing effects may be exhibited as visual artifact(s) of two or more frames (e.g., a partial old frame and a partial new frame) within a single screen draw. Tearing may occur when the video feed to the display device is not in sync with the display device's refresh. Tearing effect signals may prevent tearing as will be described in more detail below in reference to FIG. 5. Operating in command mode may be advantageous because the power requirements are significantly less than the power typically required for a device to operate in video mode.

Figure 4:
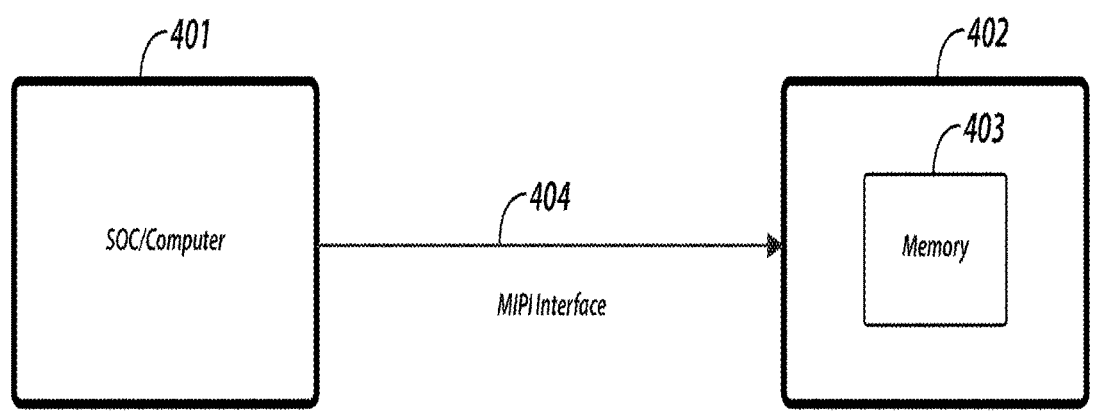
FIG. 4 is a diagram illustrating an embodiment of a System-On-A-Chip (SoC) device sending data to a display device along a communication interface.

FIG. 4 is a diagram illustrating an embodiment of a System-On-A-Chip (SoC) device 401 shown sending data to a display device 402 along a communication interface 404 (e.g., a MIPI communication interface 404). In one or more embodiments, the data sent to the display device 402 includes pixel information. One having ordinary skill in the art may appreciate that pixel information may be generated via instructions from a software application, instructions to change the brightness setting on a screen, etcetera.

However, the present disclosure is not limited to a MIPI communication interface 404 and may be equally applied to other communication protocols consistent with this disclosure. When the devices are in a display system, the communication interface 404 may be referred to as a MIPI Display Serial Interface 404.

Referring back to FIG. 4, display device 402 may comprise a local memory buffer 403 which may provide several advantages to a display system. For example, local memory buffer 403 may store data and display-related commands close to the display device 402. One having ordinary skill in the art may appreciate that having the local memory buffer 403 close to the display device 402 reduces traffic and thereby reduces power.

Without a local memory buffer, a display controller (not shown) of the display device 402 will have to access the video data (or commands) from system memory (e.g., external memory) relatively far away from the display device 402. In one or more embodiments, the display data and commands are retrieved within one hop.

During the command mode, the display device 402 has an accessible local memory buffer 403 from which it executes commands to make updates to the physical screen (not shown) of the display device 402. Typically, new frame data is transmitted to the local memory buffer 403 when there is an update to a frame. During video mode, the display device 402 typically does not have access to a local memory buffer and therefore display data needs to be transmitted continuously.

Figure 5:
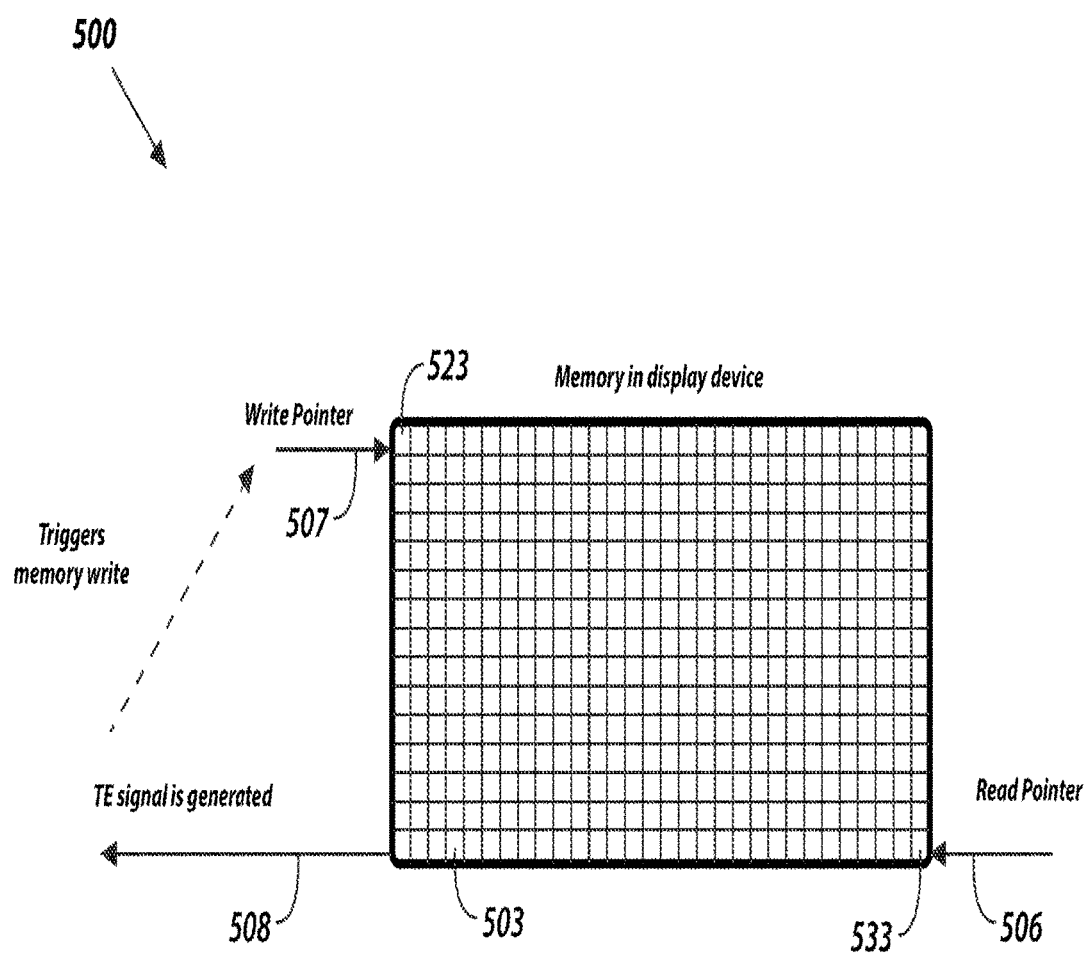
FIG. 5 is a diagram illustrating an embodiment of an operation of a display memory during operation of a command mode.

Moving forward, FIG. 5 is a diagram illustrating an embodiment of an operation of a display memory 500 during operation of a command mode. In one or more embodiments of the present disclosure, display memory 500 includes memory to store pixel information into each memory cell 503. Specifically, memory cells 523, 533 refer to the first and last cells of the display memory 500.

A read pointer 506 is shown pointing to memory cell 533 and a write pointer 507 is shown pointing to memory cell 523. In one or more embodiments, data is read from a memory cell 503 pointed to by read pointer 506 whereas data is written into a memory cell 503 pointed to by write pointer 507. For instance, in FIG. 5, data is read from memory cell 533 whereas data is written into memory cell 523.

To avoid tearing effects, none of the memory cells 503 should be read from and written to at the same time. As such, to avoid tearing within the command mode, a tearing effect signal/interrupt provides the operating system with the location of the read pointer 506 on the display screen. For instance, a tearing effect signal 508 may be generated once the read pointer reaches a specific location of the screen such as the end of the frame or near the end of the frame.

In one or more embodiments, the tearing effect signal is sent from the display device and triggers the write pointer 507 to begin writing on the frame. Therefore, the likelihood that the read pointer 506 and the write pointer 507 points to the same memory cell 503 is significantly reduced. One having ordinary skill in the art may appreciate that the tearing effect signal is used for synchronization between the read and write pointers 506, 507.

Figure 6:
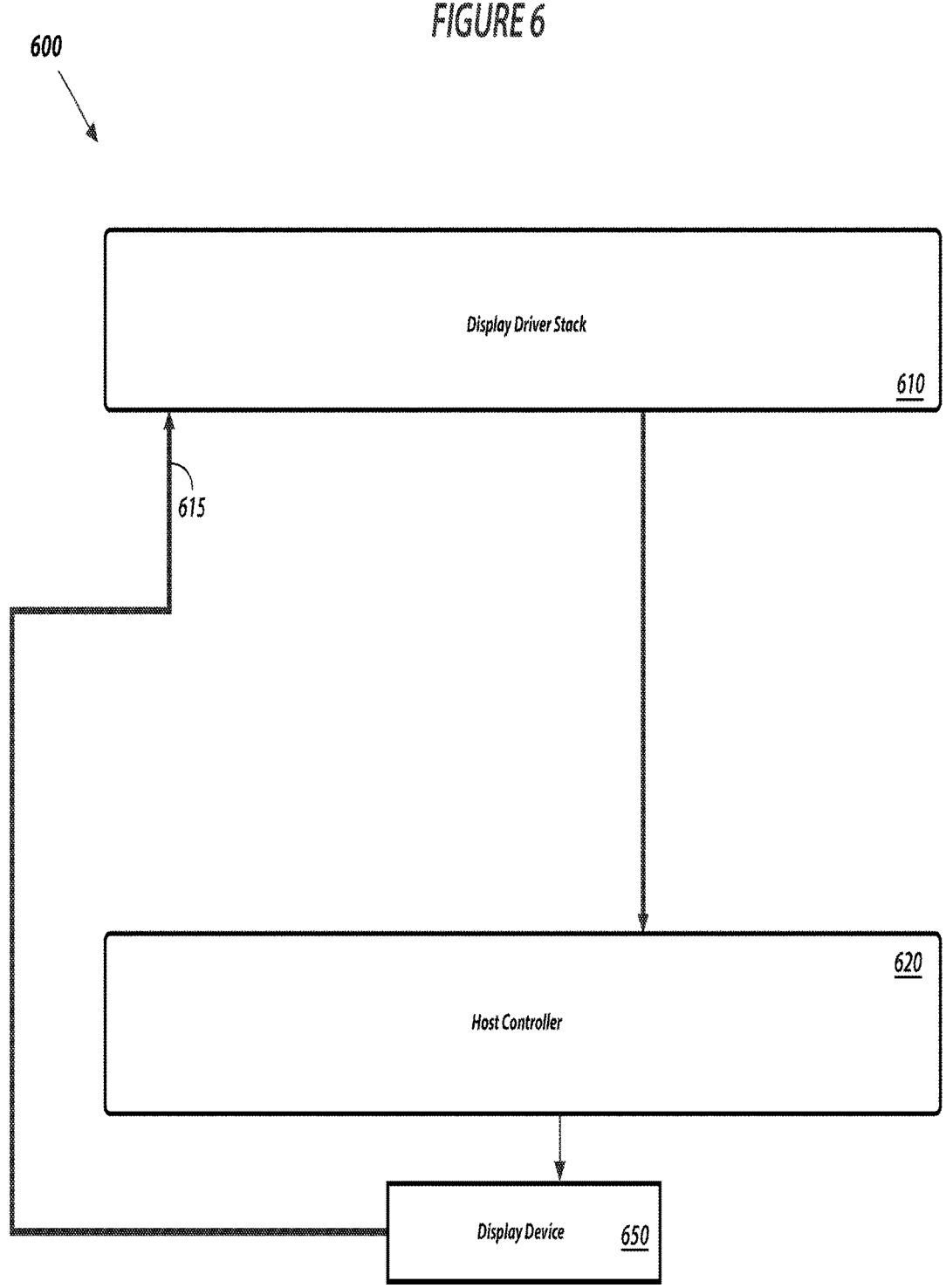
FIG. 6 is a configuration of display controller hardware.

FIG. 6 is a configuration of display controller hardware 600. Display controller hardware 600 includes a display driver stack 610 coupled to a generic MIPI host controller 620. Display drive stack 610 may include software that communicates to the operating system and other software application on how to communicate with the display device 650. In operation, display driver stack 610 receives tearing effect signals from display device 650 from signal path 615.

When the tearing effect signal propagates along the signal path 615 to display driver stack 610, display data and commands are forwarded to host controller 620. Host controller 620 may translate the signals (e.g., in MIPI) and may subsequently send the transmitted signals to the display device 650 when a new frame is received (e.g., user moves a mouse). In conventional systems, the operating system typically issues memory writes immediately after a tearing effect signal arrives and detects a need to send a new frame to display when pixel data has changed.

Most general purpose operating systems are non-deterministic and therefore do not time guarantee the handling of tearing effect signals/interrupts. Accordingly, unpredictable delays may be introduced between the generation of tearing effect signals and updating the display. If tearing effect signals are not handled timely, tearing effects may be observed on the display screen of the display device.

Figure 7:
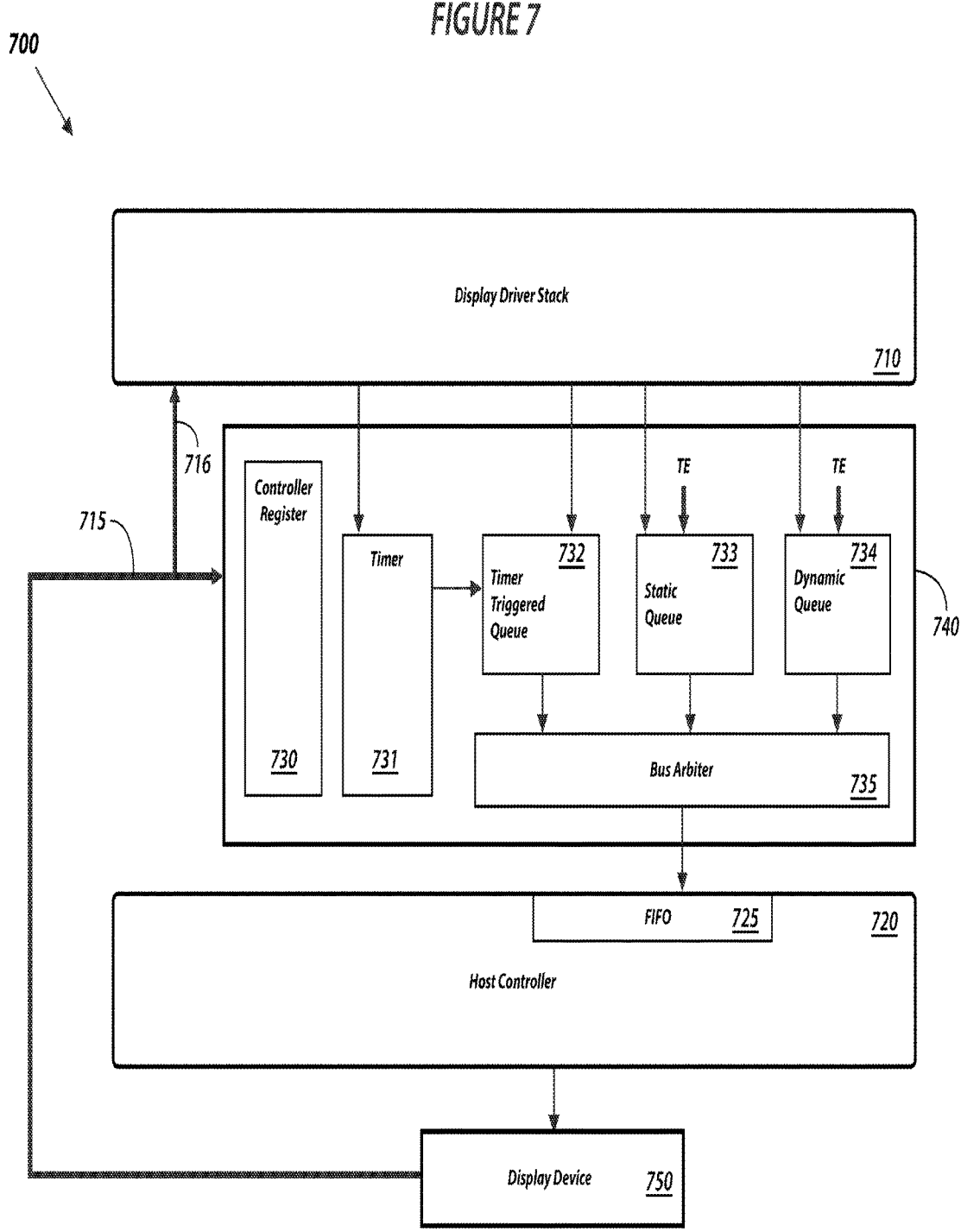
FIG. 7 is a diagram illustrating an embodiment of display controller hardware consistent with the present disclosure.

Moving forward, FIG. 7 is a diagram illustrating an embodiment of display controller hardware 700 consistent with the present disclosure. As will be described in more detail below, the addition of a command scheduler 740 may function to store and send commands to a host controller 720. In the embodiment shown, command scheduler 740 supports the following logic blocks—controller register 730, timer 731, timer triggered queue 732, static queue 733, dynamic queue 734, and bus arbiter 735.

The command scheduler 740 may send queued commands on timer input set by the display driver 710. In addition, the command scheduler 740 may send queued commands, preset commands, and pixel data upon each occurrence of a tearing effect signal.

Command scheduler 740 may support several modes of operation. For instance, command scheduler 740 may send commands based on a tearing effect signal and based on a timer effect event. In one or more embodiments, the commands sent based on a tearing effect signal event may be categorized as one of two command types. The first command type may include commands which are stored in the static queue 733 but are never auto flushed therefrom the queue 733. As such, the commands in this queue 733 are repeated for every TE event until the command(s) are removed therefrom. Accordingly, the static queue 733 may be referred to as a "sticky queue" because the commands therein are never flushed according to one or more embodiments of the present disclosure. However, in some embodiments, software may be utilized to remove commands from the static queue 733.

The second command type includes commands which are sent to the dynamic queue 734 when the operating system detects a new frame. In contrast to the commands stored in the static queue 733, commands stored in the dynamic queue 734 are flushed after they are sent (via bus arbiter 735, generic host controller 720, etc.) to a display device 750 for execution. For example, a command stored in the dynamic queue 734 may be a command type which instructs that the display device 750 perform a specific function after a certain period of time (e.g., milliseconds). Accordingly, instituting a delay in the execution of a command may ensure that a command is not sent and executed too soon. For instance, delaying the execution of commands may help in booting time/brightness setting/panel power sequencing/etc.

During operation, display device 750 generates a tearing effect signal which is propagated along signal line 715 to the display driver 710 via signal line 716. In addition, the tearing effect signal is propagated to the command scheduler 740 along signal line 715. Advantageously, the display driver stack 710 may send the tearing effect signal to the operating system as an indication that the display device 750 is functioning. In return, the operating system may send any new commands according to a user's input (e.g., detection of a new screen artifact, etc.) to the display driver stack 710. In time, these command(s) are sent to the dynamic queue 734.

As such, the dynamic queue 734 may store commands which are to be executed by the display device 750 for a new frame to be displayed. The dynamic queue 734 therefore solves the limitations present with general purpose operating systems of not being time guaranteeing.

The command scheduler 740 ensures that commands are timely executed to prevent frame drops and glitches from occurring. In one or more embodiments, the commands stored in the dynamic queue 734 may be continuously flushed of old commands ("dirty frames") after they have been executed by the display device 750.

Accordingly, the dynamic queue 734 is filled with new commands to display new frame(s) on the display device 750. Advantageously, the operating system is able to distinguish between new frames and dirty frames such that new, unexpected commands are executed to display the new frames.

For example, when a new frame is detected by the operating system, commands for displaying the new frame is sent to the dynamic queue 734. In time, a memory write command (e.g., 0x2c), along with the memory address where the pixel data associated with the new frames are stored, may be stored in the dynamic queue 734. Once a tearing effect signal is received, a command (or set of commands) is propagated to the First In First Out (FIFO) buffer 725 of the host controller 720 via the bus arbiter 735 and eventually executed by the display device 750.

It should be appreciated by those having ordinary skill in the art that the commands for the new frame are synchronized with the tearing effect signal to prevent tearing effects on the display device 750. Advantageously, the command scheduler 740 schedules and sends the commands to the display device 750 in a timely manner according to its dedicated hardware without any aid from the operating system.

In addition, when a tearing effect signal is received by the command scheduler 740, commands within the static queue 733 are executed by the display device 750. Most importantly, the commands within the static queue 733 are not flushed after they are executed by the display device 750 such that the commands within this queue 733 are executed each time a tearing effect signal is received from the command scheduler 740.

For example, when a tearing effect signal is received, a memory write command (e.g., 0x2c), along with the address where the pixel data information is stored, may be sent to the FIFO buffer 725. In this example, the memory write command (0x2c) remains in the static queue 733 after the command is executed by the display device 750.

In particular, static queue 733 may retain commands that are executed during boot up of display device 750. More specifically, the commands executed in a typical EFI (or UEFI) or GOP environment may be stored in static queue 733 and scheduled by the command scheduler 740. Although the display device may operate exclusively in the command mode, the execution of commands stored in the static queue 733 may emulate operating in the video mode without software intervention.

Accordingly, the command scheduler 740 may be utilized to negate the distinction between operating in traditionally defined "video" and "command" modes because all commands associated with either mode is prioritized and executed according to the configuration of the command scheduler 750 as described herein.

In addition, status bits may be associated with both static queue 733 and dynamic queue 734 to indicate whether commands are presently stored in each respective queue. In addition, commands may also be removed from queues 733, 734 according to a dequeue instruction.

In one or more embodiments of the present disclosure, the static queue 733 and the dynamic queue 734 cannot send commands to the host controller 720 simultaneously. As such, commands from only one of the queues 733, 734 may be sent to the bus arbiter 735 at any given time. The order that the commands are sent from the static queue 733 and the dynamic queue 734 (in addition to the timer triggered queue) may be determined by a priority scheme employed by the bus arbiter 735 as will be described in more detail below.

The command scheduler 740 may also schedule commands which need to be executed at a particular time. For instance, these type of commands may have a value component associated therewith. For example, if a user adjusts the brightness of the display device 750 (e.g., backlight) from a setting A (e.g., 25) to a setting B (e.g., 75), the brightness may increase linearly to effect a smooth transition. Accordingly, a timer block 731 may work in cooperation with the timer triggered queue 732. Timer block 731 may include a free running, general purpose timer.

In addition, there are some commands which should be delayed before being executed by the display device 750. For example, command scheduler 740 may institute a delay between two or more command executions to preserve and extend the lifetime of the display device 750.

For commands based on timer interrupt(s), the display driver stack 710 may write the commands to be sent in the timer triggered queue 732 along with a time duration at which these commands need to be sent for execution. When the timer value matches the time stamp, the command may be transferred to the host controller FIFO 725 and sent across the display device 750 for execution.

Accordingly, the command scheduler 740 may schedule various types of commands such as those which are time sensitive (e.g., commands which need to be delayed and stored in the time triggered queue 732). The command scheduler 740 may also store commands that are always executed upon receipt of each tearing effect signal (commands stored in the static queue 733). Furthermore, commands related to the operating system's detection of a new frame, and executed at the event a TE interrupt signal, are stored in the dynamic queue 734.

Moving along in the figure, bus arbiter 735 selects the timer triggered queue 731, static queue 733 or the dynamic queue 734 to receive commands from either queue. Thus, only one of the queues 733, 734 may send commands to the bus arbiter 735 at any given time. In one or more embodiments, bus arbiter 735 includes a multiplexer component (not shown) to select commands from the timer triggered, static and dynamic queues 731, 733, 734. In one or more embodiments, bus arbiter 735 selects commands according to the order of the following priority scheme: first, dynamic queue 734; secondly, static queue 733, and thirdly, timer triggered queue 731.

However, one having ordinary skill in the art may appreciate that the present disclosure is not limited to a bus arbiter 735 comprising a multiplexer component therein. Any component within the bus arbiter 735 which may enable the bus arbiter 735 to selectively choose commands from the static queue 733 or dynamic queue 734 is within the spirit and scope of the present disclosure.

In time, after the bus arbiter 735 receives the commands from either the static queue 733 or dynamic queue 734, the bus arbiter 735 writes the commands to host controller 720. Host controller 720 may translate the commands into a format that the display device 750 may read. In one or more embodiments, host controller 720 is a generic MIPI host controller 720 and therefore translates the commands according to MIPI. The display device 750 executes the commands when received from the generic MIPI host controller 720.

Command scheduler 740 may also include a control register 730. In one implementation, control register 730 provides the overall configuration for the command scheduler 740. For example, the control register 730 may provide any of the following features—force reset the command scheduler 740, force flush the queues, enable or disable any of the queues, and set priorities for the bus arbiter 735. The control register 730 may also provide a status of the queues (e.g., full/half/empty, etc.).

Figure 8:
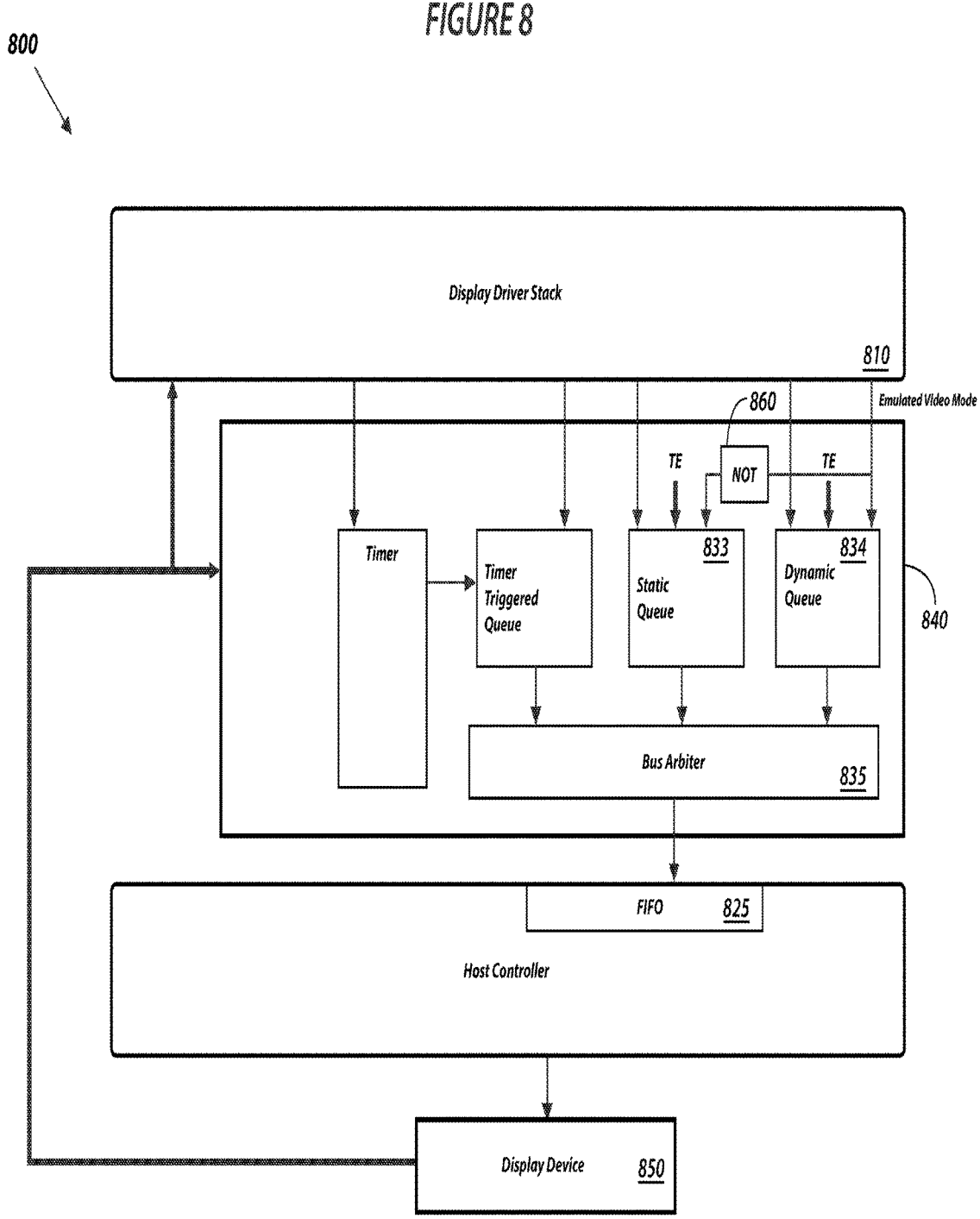
FIG. 8 is a diagram illustrating another embodiment of display controller hardware consistent with the present disclosure.

FIG. 8 is a diagram illustrating another embodiment of display controller hardware 800 consistent with the present disclosure. In the implementation illustrated in the figure, the command scheduler 840 may support an emulated video mode as will be described in more detail below.

In one or more embodiments of the present disclosure, when commands are sent on the receipt of each tearing effect signal, the display driver stack 810 selects an emulated video mode bit to enable the static queue 833. When the static queue 833 is enabled, the dynamic queue 834 is disabled because only one of the queues 833, 834 may be enabled at any given time according to one or more embodiments of the present disclosure. Disabling either one of the static or dynamic queues 833, 834 may be achieved by NOT gate 860.

In an embodiment, when the tearing effect signal is triggered, the contents of the static queue 833 is copied to the host controller FIFO 825 (coordinated by bus arbiter 835) and in time sent to the display device 850. Accordingly, the same copy actions are executed when the next tearing effect signal occurs until the display driver 810 deselects the emulated video mode bit.

In addition, when commands associated with a new frame(s) are sent upon receipt of a TE signal, the display driver stack 810 selects the compliment of the emulated video mode bit to enable the dynamic queue 834. The display driver will then write the commands, in addition to the memory address of any associated pixel data in some instances, to the dynamic queue 834. Once the tearing effect signal is triggered, the commands in the dynamic queue 834 are transferred to the host controller FIFO 825 and in time executed by the display device 850.

Figure 9:
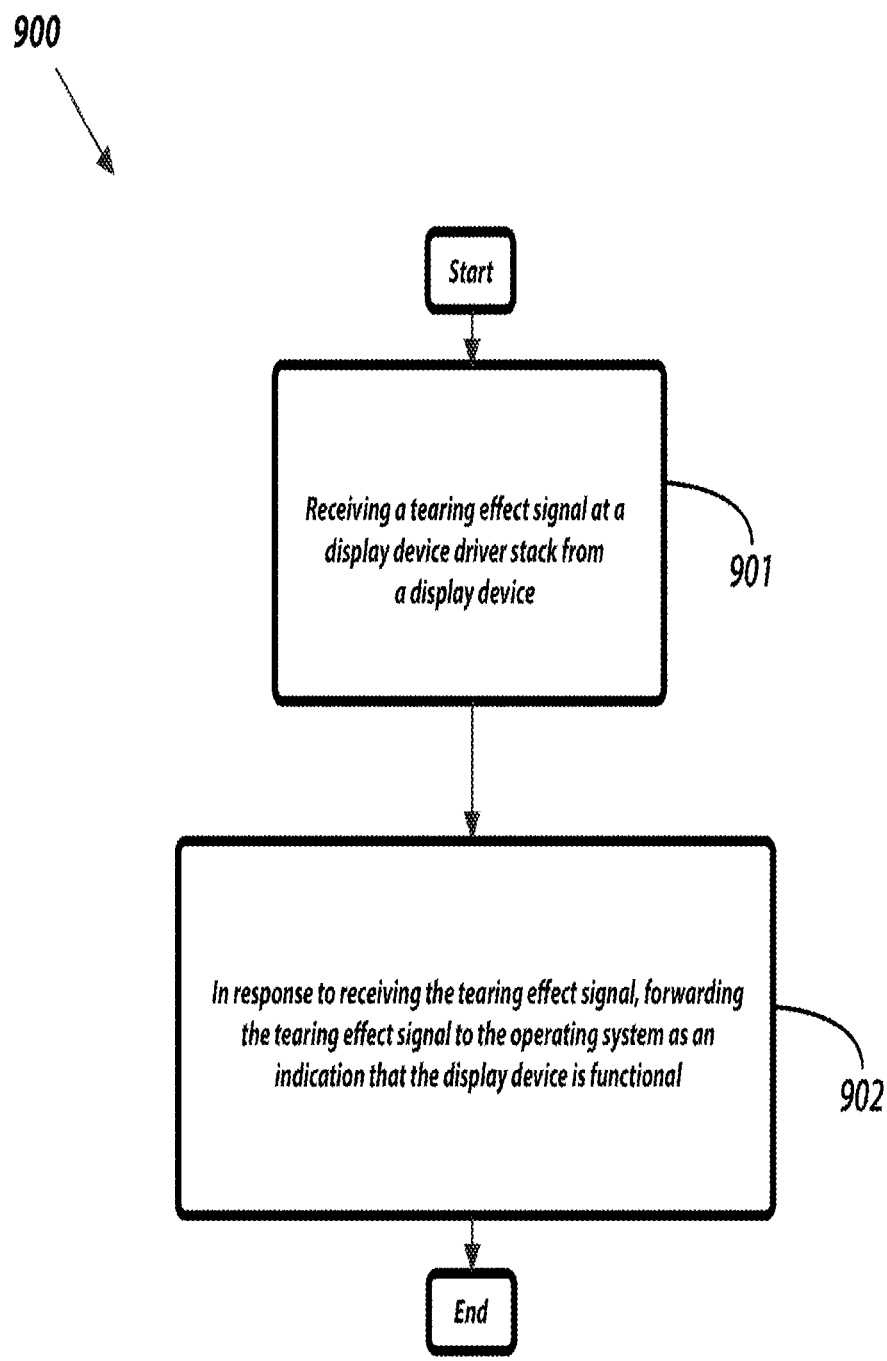
FIG. 9 is a diagram illustrating a flowchart of a method of using tearing effect signals to indicate the functionality of a display device.

FIG. 9 is a diagram illustrating a flowchart 900 of a method of using tearing effect signals to indicate the functionality of a display device. The method disclosed in flowchart 900 may be applicable to both FIGS. 7 and 8.

Block 901 provides receiving a tearing effect signal at a display driver stack from a display device. As described above, a display device may send a tearing effect signal once the read pointer reaches a specific location on a display screen. Next, in response to receiving the tearing effect signal, forwarding the tearing effect signal to the operating system (block 902) as an indication that the display device is functional.

Figure 10:
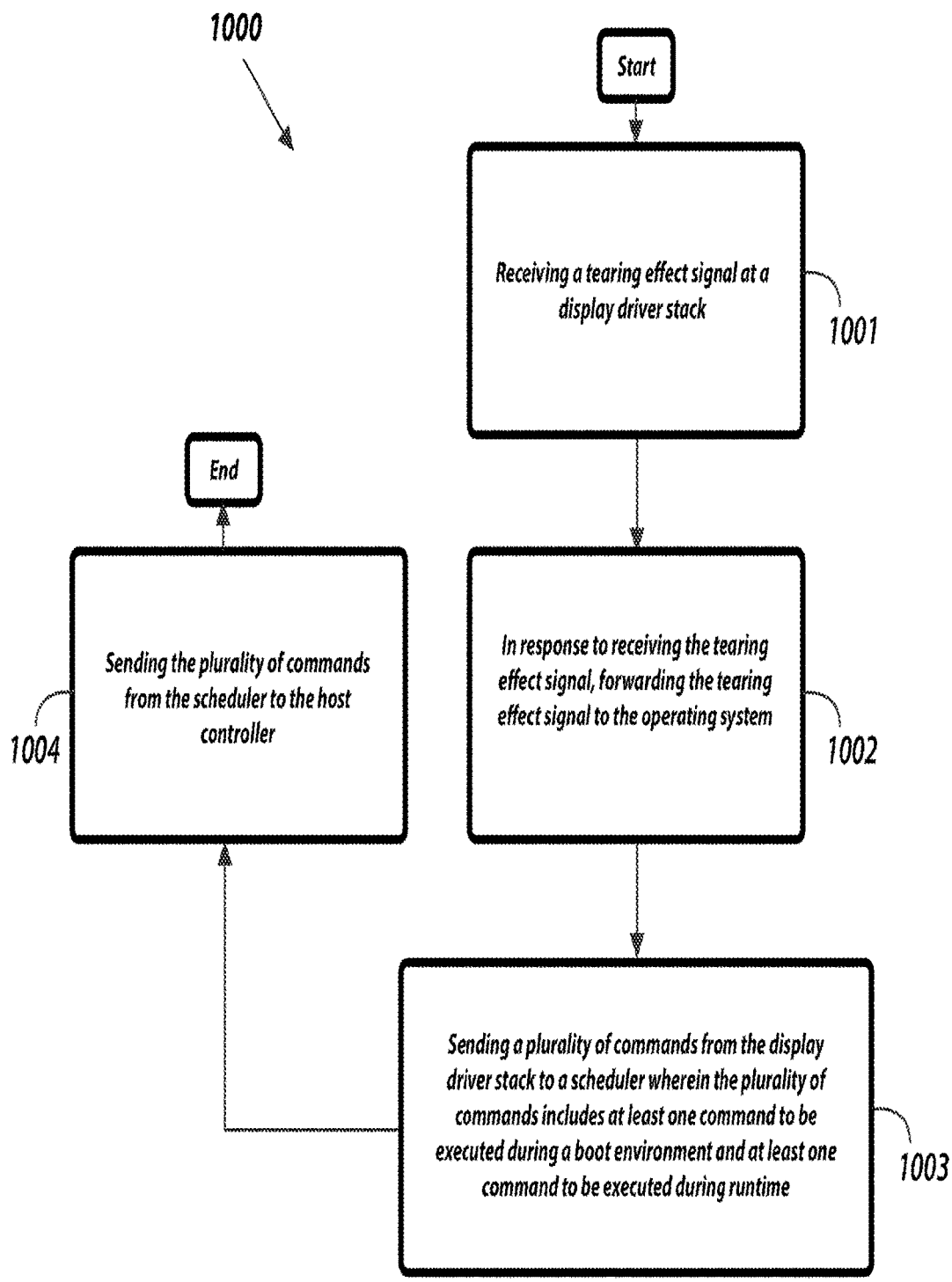
FIG. 10 is another diagram illustrating a flowchart of a method of scheduling commands within a display system.

FIG. 10 is a diagram illustrating a flowchart 1000 of another method of scheduling commands within a display system. The method disclosed in flowchart 1000 may be applicable to both FIGS. 7 and 8.

Block 1001 provides receiving a tearing effect signal at a display driver stack. In one or more embodiments, the tearing effect signal is generated and sent from the display device. Next, in response to receiving the tearing effect signal, forwarding the tearing effect signal to the operating system (block 1002).

Further, according to block 1003, sending a plurality of commands from the display driver stack to a command scheduler. The plurality of commands may include at least one command to be executed during a boot environment and at least one command to be executed during runtime. In time, the commands are sent from the command scheduler to the host controller (block 1004). In one or more embodiments, the commands are sent to a FIFO buffer of the host controller such that the commands are executed in the order they are received in the FIFO buffer.

The present disclosure solves many of the limitations present in the current state of the art. For example, systems and methods consistent with the present disclosure meets the challenge of timely executing commands associated with new frames. A command scheduler may include a plurality of queues to store commands therein. In addition, a software application may populate the queue(s) at any time, select the tearing effect signal trigger, and exit to prevent tearing from occurring even for non-real time operating systems.

Because the command scheduler receives and forwards the commands for execution without software intervention, no flickering or blanking will occur on a screen of a display device during the transition from boot up to runtime. Furthermore, the addition of a timer block within the command scheduler may be used to delay sending commands. This capability may be particularly useful for panel power sequencing during hibernation or standby modes thereby negating the need for the operating system to wait to issue sequencing commands. Moreover, a display controller hardware system consistent with the present disclosure may issue multiple updates per cycle regardless to the present state of the host controller (such as controller choke ups).

The present disclosure is not limited to a hardware configuration of a command scheduler. Accordingly, the present disclosure is amenable to include a software configuration of a command scheduler. For example, a display hardware system consistent with the present disclosure may include a microcontroller which utilizes a software program to send the various types of commands to a host controller for subsequent execution by a display device.

The present disclosure includes a system comprising a display driver stack and a scheduler coupled to the display driver stack wherein the scheduler is to receive at least one command from the driver stack. The scheduler is to queue the at least one command and is to schedule a plurality of commands to be executed during a boot environment and during runtime.

The system further comprises a host controller coupled to the scheduler wherein the host controller is to receive commands from the scheduler. The scheduler may include a timer triggered queue, static queue, and dynamic queue which all receive commands from the display driver stack. The system may further comprise a display device coupled to the scheduler to execute commands received from the host controller. The host controller includes a MIPI host controller.

The host controller may include a FIFO buffer to receive commands from the scheduler. The display driver stack may receive a tearing effect signal which in turns forwards to an operating system as an indication that a device coupled to the display driver stack is functional.

The scheduler may also send queued commands on timer input set by the display driver stack. In addition, the scheduler may also send queued commands on receipt of a TE interrupt.

The present disclosure further includes an apparatus, which includes a command scheduler to interface with a display driver and a host controller. The command scheduler may include, but is not limited to, a first queue to store commands that are to be executed upon a tearing effect signal event. In one or more embodiments, the command scheduler includes a second queue to store a fixed set of commands to write data in a fixed set of memory addresses. In addition, a command scheduler includes a third queue to store commands which are to be delayed before these commands are executed.

The apparatus may also include a timer unit to send time related triggers to the third queue. Further, the apparatus includes a bus arbiter unit coupled to the first queue, second queue, and third queue to select commands from these queues according to a predetermined priority scheme. In one or more embodiments, the bus arbiter unit is communicatively coupled to a host controller such that a host controller receives commands from the bus arbiter unit.

The command scheduler may further comprise a control register which sets the priority scheme of the bus arbiter unit. In addition, the scheduler may comprise a NOT gate coupled to the first queue and the second queue.

In some embodiments, the first queue stores commands to be executed during runtime. The second queue stores commands to be executed in an unified extensible firmware interface (UEFI), EFI, or basic input/output system (BIOS) environment. The third queue may store commands for setting the brightness of a display device.

The command scheduler further includes a control register to force reset the scheduler, force flush the first, second, or third queues, enable or disable the first, second, or third queues, and provide a status of the first, second, or third queues.

The present disclosure further includes a method which includes receiving a tearing effect signal at a display driver stack. In response to receiving the tearing effect signal, forwarding the tearing effect signal to an operating system. Further, sending a plurality of commands from the display driver stack to a scheduler wherein the plurality of commands includes at least one command to be executed during a boot environment and at least one command to be executed during runtime. In addition, the method includes sending the plurality of commands from the scheduler to the host controller.

In addition, sending the plurality of commands from the display driver stack to the scheduler includes sending the commands to a plurality of queues in the scheduler. Moreover, the method includes sending the plurality of commands from the scheduler to the host controller according to a predetermined priority set by a control register component of the scheduler.

The present disclosure further discloses an apparatus which includes a host controller and a scheduler for a display interface. The scheduler includes a first queue to store commands that are to be flushed therefrom and provided to the host controller on receipt of a tearing effect (TE) signal event. The scheduler further includes a second queue to provide its contents to a host controller. The contents of the second queue are not flushed in response to a TE signal event. The scheduler may also select between the first queue and the second queue to support an emulated video mode.

The scheduler includes a first queue to store commands that are to be executed upon a tearing effect signal event, a second queue to store a fixed set of commands to write data in a fixed set of memory addresses, and a third queue to store commands which are to be delayed before these commands are executed. Lastly, the host controller includes a FIFO buffer to receive commands from the scheduler.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still "configured to" perform a designated task if it is designed, coupled, and/or interconnected to perform said designated task. As a purely illustrative example, a logic gate may provide a 0 or a 1 during operation. But a logic gate "configured to" provide an enable signal to a clock does not include every potential logic gate that may provide a 1 or 0. Instead, the logic gate is one coupled in some manner that during operation the 1 or 0 output is to enable the clock. Note once again that use of the term "configured to" does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases "capable of/to," and or "operable to," in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus, comprising:
a processor;

a display device, to generate a tearing effect signal to indicate that a frame is to be displayed on the display device;

a host controller coupled to the display device, to operate the display device;

a command scheduler executable on the processor, wherein the command scheduler includes:

a dynamic queue to store a first set of commands that are to be executed on the display device to display the frame, wherein the command scheduler, in response to execution by the processor, is to flush the first set of commands from a first queue upon execution of the first set of command on the display device; and a static queue to store a second set of commands that are to be executed on the display device, wherein the command scheduler, in response to execution by the processor, is to keep the second set of commands stored in a second queue upon execution of the second set of commands on the display device, wherein the command scheduler, when executed on the processor, in response to a receipt of the tearing effect signal from the display device, is to retrieve from the dynamic queue or static queue and provide one of the first or second sets of command to the host controller for execution on the display device, wherein the command scheduler is to select a command from the first set of commands or second set of commands to be sent to the host controller for execution on the display device according to a priority scheme.

2. The apparatus of claim 1, wherein the dynamic queue is the first queue, and the static queue is the second queue, wherein the apparatus further comprises:

a third queue to store a third set of commands that are to be executed on the display device, wherein the commands are to be delayed before execution, and a timer unit to schedule commands stored in the third queue.

3. The apparatus of claim 2, wherein the command scheduler includes a bus arbiter unit coupled to the first queue, second queue, and third queue to select commands from the first, second or third queue, these queues to be sent to the host controller according to the priority scheme.

4. The apparatus of claim 3, wherein the bus arbiter unit is communicatively coupled to the host controller, such that the host controller receives commands from the bus arbiter unit.

5. The apparatus of claim 1, wherein the command scheduler further comprises a control register to set the priority scheme of a bus arbiter unit.

6. The apparatus of claim 1, further comprising a NOT gate coupled to the first queue and the second queue.

7. The apparatus of claim 1, wherein the first set of commands is to be executed during runtime.

8. The apparatus of claim 1, wherein the second set of commands is to be executed in unified extensible firmware interface (UEFI), or an extensible firmware interface (EFI), during a boot up of the display device.

9. The apparatus of claim 2, wherein the third set of commands is to set a brightness of the display device.

10. The apparatus of claim 1, wherein the command scheduler further includes a control register to perform at least one of: reset the command scheduler, force flush the first queue, the second queue, or a third queue, enable or disable the first, second, or third queues, or provide a status of the first, second, or third queues.

11. The apparatus of claim 1, wherein the second set of commands comprises commands to write data into a memory of the display device.

12. The apparatus of claim 3, wherein the priority scheme comprises a selection of commands by the command scheduler according to a following order: select commands from the first queue, select commands from the second queue, and select commands from the third queue.

13. The apparatus of claim 1, wherein the host controller includes a FIFO buffer to receive commands from the command scheduler.

\* \* \* \* \*